(12) United States Patent
Rytter

(10) Patent No.: US 7,303,213 B2
(45) Date of Patent: Dec. 4, 2007

(54) FLEXIBLE PIPE CONNECTED TO AN END FITTING

(75) Inventor: Jan Rytter, Svenstrup (DK)

(73) Assignee: NKT Flexible I/S, Brondby (DK)

( * ) Notice: Subject to any disclaimer, the term of this patent is extended or adjusted under 35 U.S.C. 154(b) by 105 days.

(21) Appl. No.: 10/536,942

(22) PCT Filed: Nov. 26, 2003

(86) PCT No.: PCT/DK03/00811

§ 371 (c)(1),
(2), (4) Date: May 27, 2005

(87) PCT Pub. No.: WO2004/051131

PCT Pub. Date: Jun. 17, 2004

(65) Prior Publication Data

US 2006/0082140 A1   Apr. 20, 2006

(30) Foreign Application Priority Data

Nov. 29, 2002 (DK) ............................... 2002 01843

(51) Int. Cl.
*F16L 33/00* (2006.01)
(52) U.S. Cl. ............... 285/222.1; 285/222.2; 285/222.5; 285/290.3; 138/109
(58) Field of Classification Search ............ 285/222.1, 285/222.2, 222.4, 222.5, 290.1, 290.3, 290.4; 138/109, 129, 130
See application file for complete search history.

(56) References Cited

U.S. PATENT DOCUMENTS 1,266,416 A * 5/1918 Davis ....................... 285/222.2

(Continued)

FOREIGN PATENT DOCUMENTS

FR    1054274    2/1954

(Continued)

*Primary Examiner*—Aaron Dunwoody
*Assistant Examiner*—Fannie C. Kee
(74) *Attorney, Agent, or Firm*—Merchant & Gould

(57) ABSTRACT

A pipe structure comprising a length of a flexible pipe connected to an end fitting, the flexible pipe comprising an armour layer and an underlying pipe layer the armour layer, the underlying pipe layer having an outer surface around which armouring wires of an armouring layer are helically wound. The pipe structure provides a coupling between a flexible pipe comprising armouring wires and an end fitting, the coupling exerting a relatively low bending or flexure strain on the wires during normal operation of the flexible pipe. The transition path of an armouring wire between the flexible pipe and the end fitting comprises a straight-line-section between a wire-pipe-exit-point where the wire extends away from its underlying pipe layer and a straight-line-end-point on a support unit of the end fitting where the armouring wire in question has its first tangential point of contact. This has the advantage that in a loaded situation where the armouring wires will elongate elastically leading to a change in the helical angle of the armouring wires, the pipe structure will experience a slight twist and a controlled bending of the armouring wires on the surface of the support unit (due to a possible change in the base point of contact of the armouring wire with the support unit induced by the change of helical angle), thereby avoiding substantial bending of the individual armouring wires, which is of particular importance when the armouring wires are formed of a composite material. The pipe structure may be used in flexible pipes for the off shore transport of fluids (e.g. oil).

35 Claims, 6 Drawing Sheets

U.S. PATENT DOCUMENTS

| | | | |
|---|---|---|---|
| 1,343,967 A * | 6/1920 | Gilson | 285/256 |
| 2,610,869 A | 9/1952 | Allison | |
| 2,915,323 A | 12/1959 | Richards et al. | |
| 3,112,937 A * | 12/1963 | Williams | 285/114 |
| 3,117,809 A * | 1/1964 | Smith | 285/242 |
| 3,641,658 A * | 2/1972 | Chevalier et al. | 29/423 |
| 3,799,587 A * | 3/1974 | Chevalier et al. | 285/124.1 |
| 3,936,118 A | 2/1976 | Thiery et al. | |
| 4,530,379 A | 7/1985 | Policelli | |
| 4,701,231 A | 10/1987 | Peters et al. | |
| 5,639,128 A | 6/1997 | Belcher | |
| 6,273,142 B1 | 8/2001 | Braad | |
| 6,360,781 B1 * | 3/2002 | Braad | 138/109 |
| 6,412,825 B1 | 7/2002 | Langkjaer | |
| 6,742,813 B1 | 6/2004 | Glejbol | |
| 2004/0185202 A1 | 9/2004 | Glejbol et al. | |

FOREIGN PATENT DOCUMENTS

| | | |
|---|---|---|
| FR | 2827032 | 1/2003 |
| GB | 896 485 A | 5/1962 |
| WO | WO 99/19654 | 4/1999 |
| WO | WO 01/07818 A1 | 2/2001 |
| WO | WO 02/39003 A1 | 5/2002 |
| WO | WO 02/095281 A1 | 11/2002 |
| WO | WO 03/004921 A1 | 1/2003 |

* cited by examiner

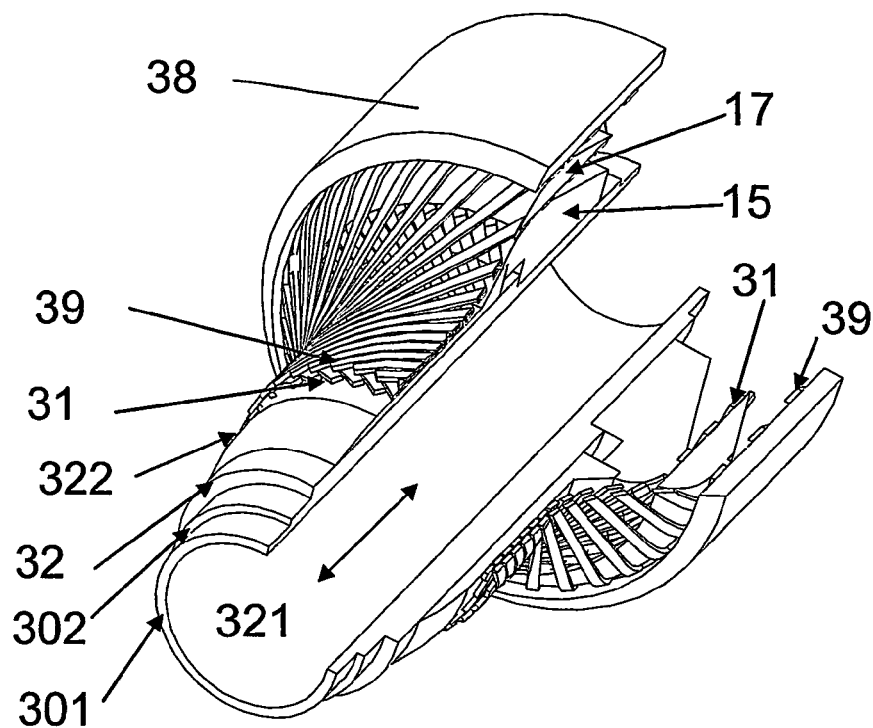
Fig. 3.a
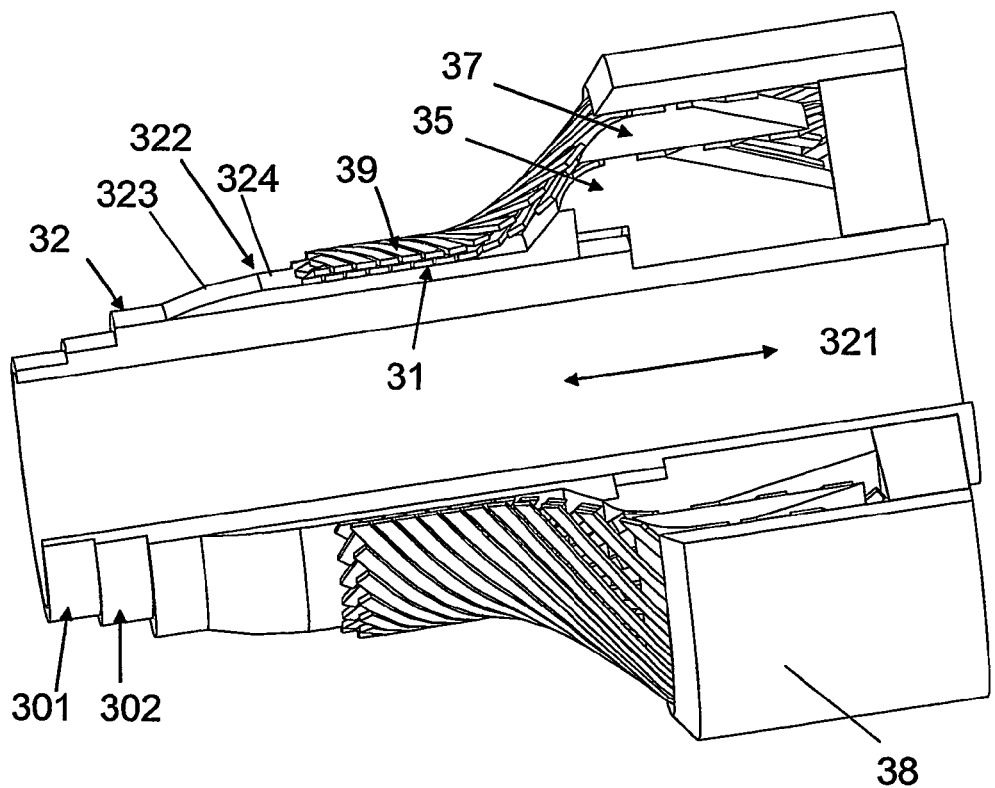
Fig. 3.b

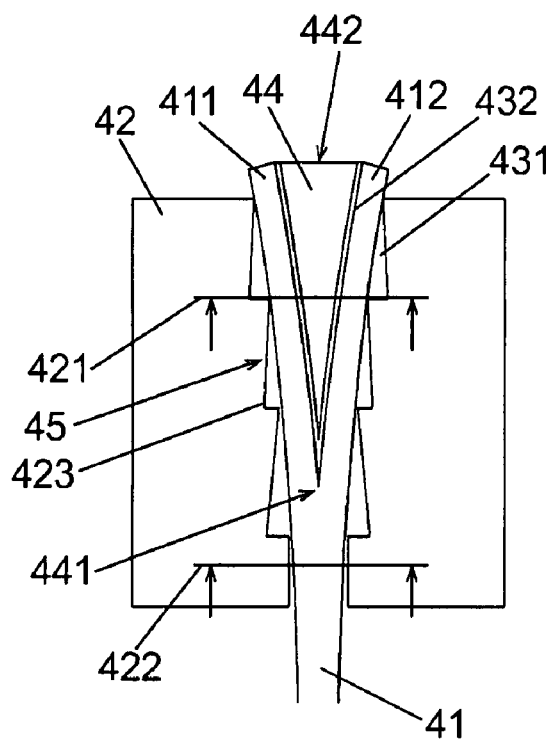
Fig. 4.a
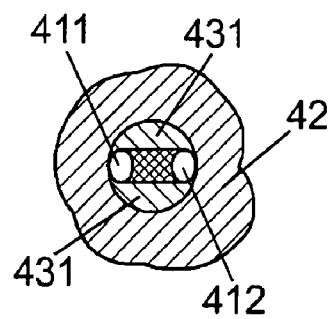
Fig. 4.b
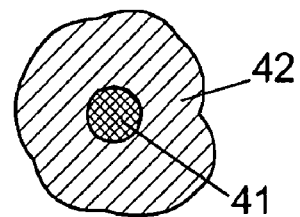
Fig. 4.c
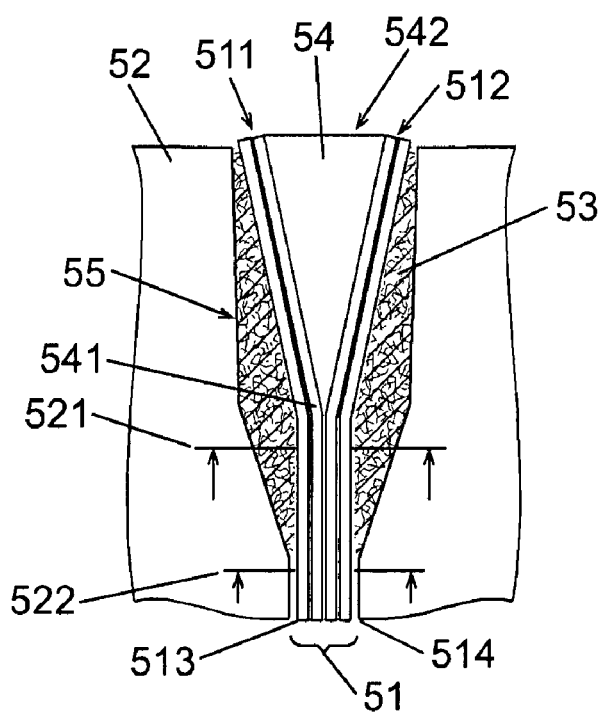
Fig. 5.a
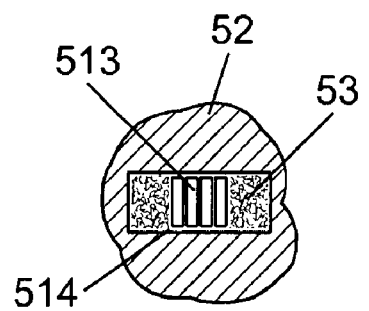
Fig. 5.b
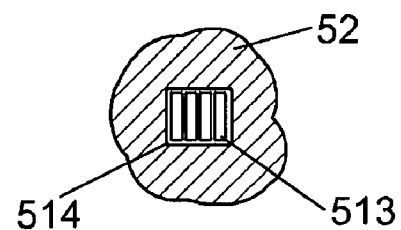
Fig. 5.c

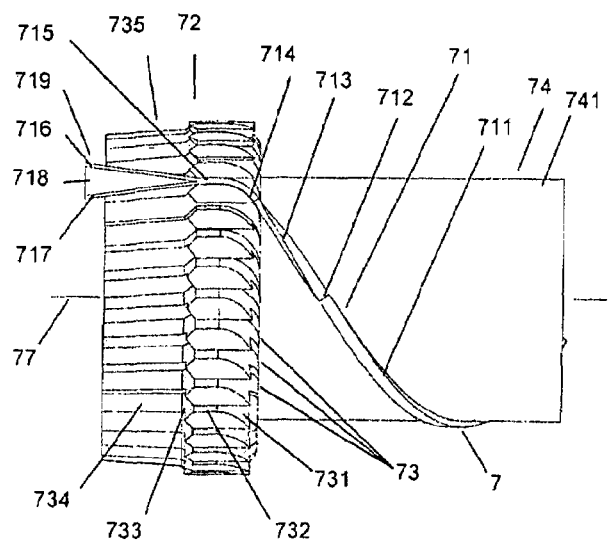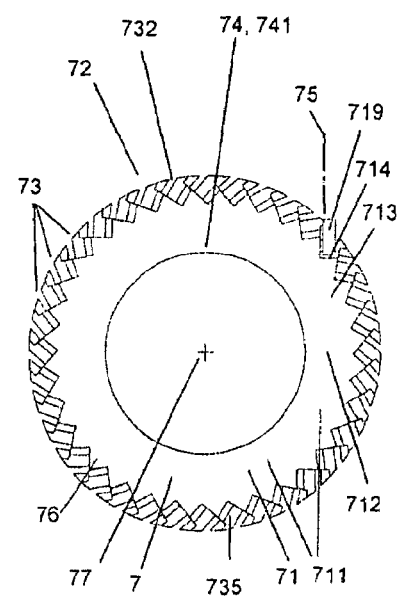
Fig. 7.a     Fig. 7.b
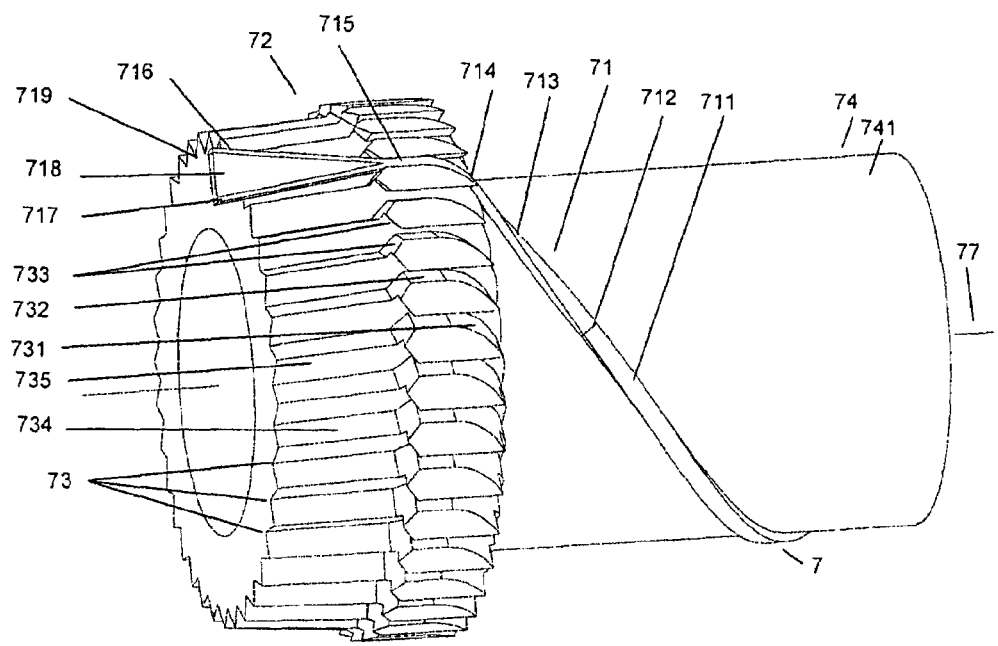
Fig. 7.c

FLEXIBLE PIPE CONNECTED TO AN END FITTING

TECHNICAL FIELD OF THE INVENTION

The present invention relates to a flexible pipe for transporting a fluid substance (e.g. oil or gas or a mixture thereof) and especially to the connection of a flexible pipe to an end fitting for connecting the flexible pipe to an installation (at land or on a vessel at sea or on the seabed) or for connecting to another pipe, e.g. another flexible pipe or a rigid pipe. The invention deals with the subject of adapting a relatively flexible pipe to a relatively stiff end fitting. The invention relates specifically to a pipe structure comprising a length of a flexible pipe connected to an end fitting, the flexible pipe comprising an armour layer and an underlying pipe layer to said armour layer, said underlying pipe layer having an outer surface around which armouring wires of an armouring layer are wound.

DESCRIPTION OF RELATED ART

Flexible pipes are used in a variety of applications, including water supply lines, sewage lines for transporting chemicals such as liquid ammonia and phosphoric acid in high-pressure off-shore applications in the oil and gas industry.

The tensile armour layer or layers of the flexible pipe and the joint between this or these layers and the end fitting provides the majority of the resistance to axial tensile loads acting on the assembly of the end fitting and the pipe. The joint between the flexible pipe and the end fitting performs the function of adapting a relatively flexible pipe to a relatively stiff fitting.

Un-bonded flexible pipes are conventionally reinforced with metallic wires, wound at an angle around the pipe to give the pipe its increased flexibility. A conventional metallic armoured pipe is very stiff both radially and axially, thus limiting the problem of the transition in flexibility of the structure from the running length of pipe to the connector unit. Further, a conventional steel armouring element, wire, may yield to a local intensity of stress, caused by an abrupt change in stiffness, without reducing the load bearing capacity of the element. Solutions for the anchoring of metallic armouring elements of conventional un-bonded flexible pipes are available.

Conventional composite pipes are bonded and rigid, thus barrier- and reinforcing layers are fixed to each other at their interfaces. Further, the reinforcing fibres are embedded in resin, forming a continuous layer. Rigid composite reinforced pipes are generally less stiff than their metallic counterparts and the anisotropy of the material—giving it different properties in different directions—calls for a carefully engineered transition to the connector unit. Many solutions can be found for the anchoring of the fibre reinforced layers in conventional composite pipes, cf. e.g. U.S. Pat. Nos. 4,701,231 and 4,530,379.

Composite reinforced un-bonded flexible pipes differ from the conventional structures described above in that the pipe is axially and radially less stiff than the metallic reinforced flexible pipe and the layers containing the composite reinforcement are not continuous, but consist of a number of individual wires, each made of a composite material, which will not yield to a local stress intensity but rather initiate failure.

In the following, a novel solution to the efficient anchoring of a wire based armouring in an end connector for a flexible pipe is presented. The solution may be used for pipes reinforced with metallic or composite armouring wires and for bonded as well as un-bonded pipes.

SUMMARY

The object of the invention is to provide a coupling between a flexible pipe comprising armouring wires and an end fitting, the coupling exerting a relatively low bending or flexure strain on the wires during normal operation of the flexible pipe (i.e. in a situation—within the design specifications of the pipe—of internal and/or external radial pressure and external tension in the longitudinal direction of the pipe).

The object of the invention is achieved by the invention described in the following.

A pipe structure according to the invention comprising a flexible pipe connected to an end fitting is provided, the flexible pipe comprising an armour layer and an underlying pipe layer to said armour layer, said underlying pipe layer having an outer surface around which armouring wires of an armouring layer are wound, the flexible pipe having a longitudinal axis wherein said end fitting comprises
one or more anchoring elements adapted for anchoring at least one of said armouring wires, and
a support unit arranged coaxially around said underlying pipe layer
at least one of said armouring wires comprising
  a conforming-wire-pipe-section forming a helical path and conforming to the outer surface of said underlying pipe layer of said flexible pipe at least over a part of its length, and
  a wire-end-fitting-section,
  said two wire sections extending in opposite directions from a wire-pipe-exit-point where said armouring wire separates tangentially away from said underlying pipe layer, and
said wire follows an essentially straight line of a length $L_{free}$ between said wire-pipe-exit-point and a straight-line-end-point on said support unit, said essentially straight line part of the wire being defined as the straight-line-section.

In the present context, the term 'armouring wires' is taken to mean elongate elements having e.g. a circular, rectangular (tape formed) cross sectional form or any other form appropriate for serving the purpose of stabilizing the pipe in its longitudinal and/or radial direction.

The 'longitudinal axis' of the flexible pipe is taken to mean the axis of symmetry in a direction of fluid flow defined by the flexible pipe in operation when it is held in a straight line (uncurved) configuration.

A flexible pipe for transporting a fluid substance, egg. oil, has an inside which is in contact with the fluid substance during operation and an outside which is in contact with the environment, e.g. a marine environment. In the present context, the term 'an outer surface' of an element in a flexible pipe is taken to mean a surface that faces towards the outside (as opposed towards the inside) of the flexible pipe (not necessarily having a direct contact to the environment, though). Similarly, the terms a 'convex' or 'an outward' curvature and a 'concave' or an 'inward' curvature, respectively, are taken to be seen relative to the longitudinal axis of the flexible pipe.

In the present context, the term 'an unloaded condition' of a flexible pipe or pipe structure is taken to mean a condition where the flexible pipe is in a relaxed, unstressed situation, i.e. without being pressurised from inside or outside and without being subject to external twist or longitudinal stress.

In the present context, the terms 'wire-pipe-exit-point' and 'a straight-line-end-point' are taken to mean the end points of contact between an armouring wire and, respectively, the underlying pipe layer and the support unit of the end fitting, between which the armouring wire follows an essentially straight line. Instead of points of contact 'wire-pipe-exit-point' and 'a straight-line-end-point' are to be interpreted as lines or curves of contact, if said wire has a cross section that adapts to the surface of said underlying pipe layer and/or said support unit, e.g. a tape form. The same applies to a 'support-unit-exit-point' (see later) where the armouring wire leaves the surface of the support unit for being locked in one of the anchoring elements.

In a preferred embodiment the ratio of the 'free length' or 'straight-line-section' $L_{free}$ (in an unloaded condition of the pipe) of an armouring wire to its maximum cross sectional dimension $D_{wire}$ is larger than 2, preferably in a range from 2-20, more preferred in a range from 5-10, the 'free length' being defined as the length of an armouring wire between its exit point from the underlying pipe layer (the 'wire-pipe-exit-point') and its point of contact with the support unit of the end fitting ('straight-line-end-point').

An advantage of the invention is that in a loaded situation comprising a combination of internal pressure and external tension and where the armouring wires will elongate elastically leading to a change in the helical angle of the armouring wires, a pipe structure according to the invention will experience a slight twist and a controlled bending of the armouring wires on the surface of the support unit (due to a possible change in the base point of contact of the armouring wire with the support unit induced by the change of helical angle), thereby avoiding substantial bending of the individual armouring wires. This is for example of particular importance when the armouring wires are formed of a composite material. A complete and simple anchoring can then be incorporated in the end fitting design at any point after the 'straight-line-end-point' on the support unit (in the direction of the end fitting, i.e. when viewed from the pipe towards the end fitting), as the wire after this point is only stressed in its own direction.

The various parts of an end fitting may preferably be made of structural materials e.g. metals such as steel, titanium, aluminium, reinforced polymers such as fibre glass/polyester, carbon-fibre/epoxy, etc. The parts may e.g. be manufactured by a numerically controlled machine or by moulding.

In an embodiment of the invention, the wire-end-fitting-section is arranged to follow a predefined termination path between said wire-pipe-exit-point and one of said anchoring elements when said pipe structure is in an unloaded condition. The dynamic range of locations of the wire-pipe-exit-point and the straight-line-end-point may be predetermined according to the normal operating conditions of the pipe structure. The part of the wire-end-fitting-section of the armouring wire that is located after the dynamic range of locations of the straight-line-end-point (when viewed in a direction of the end fitting) may be fixed to a predetermined path on the support unit (e.g. using guiding channels or the like) to simplify the mounting of the flexible pipe to the end fitting.

In an embodiment of the invention, the straight-line-section is essentially unsupported between said wire-pipe-exit-point and said straight-line-end-point on said support unit. The term 'essentially unsupported' is in the present context taken to mean having a negligible effect on the deformation behaviour of the wire.

In an embodiment of the invention, the straight-line-section extends away from said longitudinal axis when viewed from said wire-pipe-exit-point.

In an embodiment of the invention, the straight-line-section of said armouring wire has a tangential point of contact with said support unit in said straight-line-end-point. In this embodiment, the armouring wire has a free (i.e. mechanically unrestricted) linear path between the points of contact with the underlying pipe layer and the support unit. Alternatively, the armouring wire may be strained in contact with (but without locking it to) the support unit e.g. by a surrounding body (e.g. in the form of an assisting element, see later), in which case the slope of the straight-line-section of the armouring wire may deviate from the tangent to the support unit at the point of contact.

The underlying surface to the armour may have significant stiffness established through an insert. This will reduce the angular change of the helix of the armouring wires during loading.

In an embodiment of the invention, said underlying pipe layer of said flexible pipe comprises an armouring reinforcement on a section of the pipe structure including said wire-pipe-exit-point and extending in a direction of the end fitting as defined by a direction from the flexible pipe towards the end fitting.

An armouring reinforcement may be present (if necessary for the operating conditions of the pipe in question) and comprise an annual armouring body forming part of the underlying pipe layer and is intended for supporting the flexible pipe over the part of the end fitting where some of the armouring wires are leaving the flexible pipe for being supported by the support unit, thereby weakening the armouring effect. Alternatively an armouring reinforcement may form part of the support unit and annularly enclose the underlying pipe layer so that the wire-pipe-exit-point is located on the armouring reinforcement-part of the support unit. In an alternative embodiment, this substitute armouring layer may be inserted on the inner side of the armouring layer or layers in question, in which case the wire-pipe-exit-point will be located on the so-called underlying pipe layer. The purpose of the armouring reinforcement is to give a mainly radial stiffness over its length and represents a transition between the flexible pipe and the stiff end fitting.

In an embodiment of the invention, said predefined termination path further comprises a supported-wire-section running on the outer surface of said support unit from said straight-line-end-point to a support-unit-exit-point where the armouring wire leaves the surface of said support unit for being locked in one of said anchoring elements, said supported-wire-section essentially constituting a geodetic curve between said straight-line-end-point and said support-unit-exit-point on said outer surface of said support unit.

In the present context the term 'a geodetic curve' is taken to mean a curve on a surface for which the curve has a primary normal vector which in all points is identical to the normal vector of the surface. A geodetic curve on a surface represents the shortest distance along the surface between two points on the surface. A geodetic curve on a surface has a geodetic curvature $\rho_g=0$, the geodetic curvature of a curve at a point P on a surface being defined as the length of the projection (calculated with sine) of the vector of curvature on the tangent plane of the surface at the point P. The vector of curvature $\rho n$ of curve r(s) at a point P (given as $r_1(s)$) is defined as $d^2 r_1/ds^2 = \rho n$, $\rho$ being the curvature of the curve at the point P and n a unit vector.

The term 'essentially constitutes a geodetic curve' is in the present context taken to mean that the path in question follows a geodetic curve on the surface of the support unit in question within the mechanical processing tolerances, e.g. so that the relative length difference between the actual path and the geodetic curve is less than 5%, preferably less than 1%.

The advantage hereof is that the armouring wires are located in stable positions when the flexible pipe is in an unloaded state because all wires are positioned to follow a shortest possible path on the support unit of the end fitting. This minimizes the 'repositioning' of the armouring wires when the flexible pipe is loaded.

A geodetic curve between two points on a surface may in practice be found by means of a string with no bending resistance, which under tension will find the shortest path between two points.

In an embodiment of the invention, said support unit has an outer surface that describes a surface of revolution with an axis of revolution that coincides with the longitudinal axis of the flexible pipe. This has the advantage of providing a symmetric element which is relatively easily manufactured. Alternatively, the support unit may take many other forms, e.g. more complex forms where elements are arranged to receive individual armouring wires. In an embodiment of the invention, the supporting surface of the support unit in the area where the straight-line-end-point is located is individually formed for different wires having their straight-line-end-point located on the support unit. An advantage thereof is that assembly of the wires to the end fitting is eased and reliability improved. In an embodiment of the invention, the supporting surface of a wire is a single curved surface oriented such that any normal to the single lies in a plane that is parallel to any plane containing the longitudinal axis of the pipe. In the present context, "a single curved surface" is taken to mean a surface that curves in only one dimension (a simple example is a cylinder generated by a circle, but any other curve may be used). The use of a single curved surface in the present construction has the advantage that the construction of the individual surface parts are well-suited for implementation with standard manufacturing tools (e.g. numerically controlled tools).

Typically, the support unit is arranged around and 'resting on' the underlying pipe layer. It might, however, alternatively be arranged around the underlying pipe layer without touching it or resting thereon. In an embodiment of the invention, the support unit comprises an annular body with an opening that fully encloses the armouring layer in question around which the support unit is mounted coaxially, the opening being of a form and size that allows the support unit to be positioned relative to the underlying pipe layer in such a way that a straight line path ('the straight-line-section) is defined between a wire-pipe-exit-point on the underlying pipe layer to a point of contact ('the straight-line-end-point') on the inner outline of said opening of the support unit. In an embodiment of the invention, the surface around the location of the predicted points of contact during normal operation is formed so that its surface is concave when seen relative to the longitudinal axis of the flexible pipe in a cross section including said axis. In an embodiment of the invention, the support unit is arranged annularly around the underlying pipe layer, e.g. in the form of an annular ring (e.g. a torus) with an inner diameter that is larger than the diameter of the underlying pipe layer so that an armouring wire may have its straight-line-end-point on the annular ring surface and a supported-wire-section that extends through the inner opening of the annular ring for being locked in an anchoring element.

In an embodiment of the invention, the anchoring elements form part of the support unit.

In an embodiment of the invention, said support unit has an outer surface which includes a part of a torus on which the 'straight-line-end-point' is located.

The term 'an outer surface which includes a part of a torus' is in the present context taken to mean that said surface has a part that has the shape of a part a torus, e.g. corresponding to a 15 or 45 or 90 degree cut of a fully revolved torus (the quoted angles being centre angles of the local circle that generates the torus by a 360° rotation about its axis of revolution).

In a preferred embodiment, the pipe structure is adapted so that the SAME geodetic curve is used by an armouring wire when the flexible pipe is in an unloaded situation as when the flexible pipe is loaded, the only difference being that the point of contact changes along the length of the geodetic curve in question (whereby the angle of the free path of the armouring wire varies). The decisive parameters determining the course of the armouring wire on the torus surface are, respectively, a) the diameter of the layer on which the armouring is wound (e.g. the underlying pipe layer), b) the helix angle (the winding angle e.g. relative to the longitudinal axis of the flexible pipe, e.g. 54°), c) the diameter of the circle of the torus body in a cross section perpendicular to a direction of revolution (the local diameter), and d) the diameter of the circle of revolution generating the torus (the global diameter).

In practice it may be necessary to deviate from this optimum geometry for other considerations, but with the knowledge acquired through this solution, the additional stresses may be predicted and an acceptable compromise can be achieved.

In an embodiment of the invention, said support unit has a convex part with an outer surface with an outward curvature and said 'straight-line-end-point' is located on said convex part of the support unit.

This has the advantage of providing a relatively easily manufacturable part that may be positioned annularly around and resting on said underlying pipe layer and with an outer surface that extends away from the longitudinal axis at least over the convex (e.g. torus-formed) part of the surface of the support unit where the armouring wire in question 'lands' (.i.e. around the predicted location of the straight-line-end-point when the flexible pipe is operated within its specifications).

In an embodiment of the invention, said support unit comprises at least a first and a second body, the outer surfaces of each body having a different geometrical form, and said straight-line-end-point is located on said first body. In an embodiment of the invention, the outer surfaces of said first and second bodies of the support unit are separated by a gap. In an embodiment of the invention, said first and second bodies of the support unit are adjoined. In an embodiment of the invention, said second body of the support unit comprises dedicated elements for receiving and/or guiding one or more armouring wires.

In an embodiment of the invention, said support unit comprises at least a first and a second body, said first body of the support unit has an outer surface which includes a part of a torus, and said second body has an outer surface that describes a surface of revolution, both surfaces having the same axis of revolution, said axis coinciding with the longitudinal axis of the flexible pipe, and both surfaces having coinciding tangents in a joining point in a cross sectional plane including the axis of revolution.

In a preferred embodiment, said second body is a cylinder. Alternatively the second body may include a conoid part, whose surface extends away from or verges on its axis of revolution when viewed from the torus formed part of the support unit in the direction of the end fitting. In another preferred embodiment, the support unit comprises a concave part extending from the convex part of the support unit hosting the straight-line-end-point in a direction towards the wire-pipe-exit-point, the concave part having an outer surface with an inward curvature (or a linear surface, when viewed in a cross section including the longitudinal axis of the flexible pipe).

In an embodiment of the invention, said second body comprises guiding elements for guiding armouring wires received from said first body.

In a preferred embodiment the second body comprises guiding channels for guiding armouring wires received from the first body. The purpose of the guiding channels is to lead the armouring wires from the first body in the direction of the anchoring elements. The channels may extend fully or partially over the length of the second part of the support unit. The channels may be fully or partially embedded in the support unit, i.e. may constitute buried channels over a part of their longitudinal extension. The inclusion of guiding channels is an advantage for the mounting of the end fitting with the flexible pipe and feasible because the armouring wire will only be stressed in its own longitudinal direction after leaving the first body of the support unit.

In an embodiment of the invention, said anchoring elements for locking said armouring wires to said end-fitting are distributed on one or more terminating parts.

It may be an advantage to separate the anchoring elements from the support unit by providing the anchoring elements in one or more terminating parts, to be able to customize the support unit and the terminating part(s) individually.

In an embodiment of the invention, the flexible pipe comprises more than one armouring layer and separate support units and terminating parts are allocated to each layer.

In an embodiment of the invention, separate support units and terminating parts are arranged sequentially after each other along the longitudinal axis of the flexible pipe, e.g. first the support unit(s) and terminating part(s) corresponding to the outermost armouring layer followed by the support unit(s) and terminating part(s) corresponding to the second outermost armouring layer, etc.

In another embodiment of the invention, corresponding of said separate support units and terminating parts, respectively, are arranged concentrically around each other, the element corresponding to the innermost armouring layer being arranged closest to the axis of the flexible pipe (i.e. support units are arranged concentrically around each other followed in a longitudinal direction by terminating parts being arranged concentrically around each other).

In yet another embodiment of the invention, a combination of sequentially and concentrically arranged support units and terminating parts are used.

In an embodiment of the invention, the straight-line-section of an armouring wire is surrounded by a material which does not substantially alter the deformation behaviour of the flexible pipe and the wire.

To avoid the intrusion of impurities, it may be advantageous to fill the space around the free path part (or straight-line-section) of the armouring wire path with a filler that does not substantially affect the free movement of the armouring wire. Such material could e.g. be a suspension or emulsion of a polymer, e.g. polyethylene or polyurethane. A further advantage hereof is that such a material may be used for cooling or flushing purposes, if the end fitting is cooled with a coolant, e.g. water to remove heat from the transported fluid of the flexible pipe, e.g. an oil of an elevated temperature compared to room temperature.

In an embodiment of the invention, said pipe structure further comprises an assisting element arranged coaxially around said armour layer and adapted for maintaining at least one of said armouring wires in contact with the outer surface of said underlying pipe layer, and said armouring wire conforms to said underlying pipe layer between said assisting element and said wire-pipe-exit-point in which the armouring wire separates tangentially away from said underlying pipe layer.

In an embodiment of the invention, the pipe structure comprises an assisting element arranged coaxially around said underlying pipe layer and adapted for guiding at least one of said armouring wires.

In an embodiment of the invention, an assisting element is adapted for supporting armouring wires from a particular one of the one or more armouring layers of the flexible pipe.

In an embodiment of the invention, an annular assisting element is arranged around an armouring layer to maintain at least one armouring wire in contact with the support unit at the straight-line-end-point, in which case the slope of the straight-line-section of the armouring wire may differ from the tangent to the surface of the support unit in the straight-line-end-point.

In an embodiment of the invention, an assisting element forms part of the end fitting.

In another embodiment of the invention, an assisting element forms part of the flexible pipe, e.g. in the form of an armour holding layer around an armouring layer, the armour holding layer being terminated at a point of the flexible pipe structure located before the support unit of the end fitting, when viewed in a direction of the end fitting. Alternatively, an assisting element may take the form of a discrete annular ring positioned around an armouring layer at certain intervals over a length of the flexible pipe, one of these rings being used for guiding an armouring wire towards its corresponding support unit.

In an embodiment of the invention, the flexible pipe is an un-bonded flexible pipe, preferably comprising a tube formed by an inner armouring layer (carcass) surrounded by a liquid tight inner liner and one, two or more outer armouring layers.

An un-bonded flexible pipe has the advantage over a corresponding bonded type that it is more flexible.

In an embodiment of the invention, said flexible pipe comprises two layers of helically wound armouring wires, the winding angles with respect to the longitudinal direction of the flexible pipe being between 50 and 60°, such as between 53 and 56°, e.g. 55° said armour layers preferably comprising helically wound wires which are wound in opposite directions in neighbouring layers. This has the advantage of providing a balanced pipe whose length has a relatively small dependence on its operating conditions such as pressure and temperature.

For a composite reinforced un-bonded flexible pipe, no solutions are available to facilitate the transition in stiffness of the pipe and connector structure without drastically reducing the load bearing capacity of the composite armour. This is a result of the opposing desires to control the stiffness on one hand and make a complete, secure, and thus very stiff anchoring on the other hand.

In an embodiment of the invention, said armouring wire or wires are made of a composite material, said composite material preferably comprise one or more polymers, such as epoxy, thermoplastic and polyurethane, optionally comprising reinforcing fillers such as fibres and/or whiskers. An advantage thereof is that the pipe is stronger (tensile strength) and lighter (which is a special advantage during layout and use in deep sea environments), and more corrosion resistant in certain media than a corresponding pipe comprising metallic armouring wires.

A composite material is in the present context taken to mean a material comprising several parts, e.g. of different atomic structure, different chemical composition, e.g. a matrix of a given material comprising enclosed elements of another material or micro-structural constitution (e.g. microcrystalline grains in an otherwise amorphous matrix) or a layered material comprising distinct layers of different materials or identical materials in a sandwich structure.

In an embodiment of the invention, said armouring wire or wires are in the form of a layered wire comprising 2 or more layers of materials which may be identical or different from each other. A layered wire is a wire made up of thin strips, assembled longitudinally on each other. This has the advantage of being able to combine properties of different materials, the tapes/strips may be pre-fabricated, provide ease of handling, and/or be readily deformable in the pipe manufacturing process.

In an embodiment of the invention, said armour layers of the wire or wires are made from one or more of the materials selected from the group consisting of metals, such as steel, thermoplastic polymers such as polyurethane and thermosetting polymers such as epoxy, said polymeric materials optionally comprise reinforcing fillers such as fibres and/or whiskers.

In an embodiment of the invention, said armouring wire or wires is/are in the form of a layered wire comprising 2 or more layers of materials which layers are held together by a wrapping material and/or by adhesive forces. An advantage of using a wrapping material is that it may save the use of adhesives. An advantage of using an adhesive is that it maintains positions of the layers and the assembly structure in production and provides means/possibility to splice.

In an embodiment of the invention, the or each armour layer comprises one or two armouring wires. In another embodiment of the invention, each armouring layer comprises a multitude of armouring wires.

In an embodiment of the invention, said armouring wire(s) is/are flat, said wire or wires having a square formed cross section, optionally a square formed shape with rounded corners. This has the advantage of providing a compact solution that minimizes the volume around the wires taken up by air (when compared e.g. to a solution with circular wires).

In an embodiment of the invention, each of the layers of the flexible pipe is fixed to the end-fitting.

In an embodiment of the invention, said end-fitting comprises an axially extending through opening, said armouring wire or wires being supported by the outer surface of said support unit, wherein the outer surface means the surface turning away from the axially extending through opening.

In an embodiment of the invention, the armouring wire or wires is/are anchored by being embedded in a casting material, preferably in the form of a polymer such as an epoxy or a cementidious material. The term 'a cementidious material' is in the present context taken to mean a material bound together by cement (which is a product comprising among other things calcium, carbon, silicon, characterized in that it cures to a hard, stony compound in a reaction with water). Cementidious materials may be concrete, mortar, Portland White™, all characterized by a binder (cement) and a filler, usually rocks, stones, sand, etc. (i.e. silica based particles). This has the advantage of providing means for anchoring, by adhesion, mechanical locking, etc.

In an embodiment of the invention, the end-fitting comprises one or more locking cavities said armouring wire or wires is/are anchored in said locking cavity or cavities.

In an embodiment of the invention, the armouring wire or wires are anchored by use of a spreader element driven into the wire or wires in said locking cavity or cavities.

In an embodiment of the invention, at least one locking cavity has a length dimension defined as the length dimension of a wire mounted in the locking cavity. The cross sectional area perpendicular to the length of the locking cavity differs along its length in one or more steps or continuously, wherein a first cross section area perpendicular to the length of the locking cavity is smaller, such as at least 5% smaller, such as at least 30% smaller than a second cross section area perpendicular to the length of the locking cavity, wherein the first cross section is closer to the support unit than the second cross section.

In an embodiment of the invention, the armouring wire or wires is/are anchored by use of a spreader element driven into the wire or wires in the part of said locking cavity or cavities where a first cross sectional area perpendicular to the length of the respective locking cavity is larger than a second cross sectional area perpendicular to the length of the respective locking cavity, the second cross section being taken closer to the support unit than the first.

In an embodiment of the invention, the armouring wire or wires is/are anchored to the end-fitting by use of a spreader element driven into the wire to thereby spread the wire into two or more laminates whereby the laminated wire or wires is fixed against the wall or walls of a locking cavity formed in the end-fitting. In a preferred embodiment, the armouring wire or wires is/are embedded in a casting material in the locking cavity, preferably additionally using a wedge element driven into the wire.

In an embodiment of the invention, the flexible pipe comprises two armour layers and the end fitting comprises two annular support units, the wire or wires of a first armour layer being supported by a first annular support unit, and the wire or wires of a second armour layer being supported by a second annular support unit.

In an embodiment of the invention, the pipe structure comprises a reinforcement sleeve layer placed below the one or more armouring layer or layers, said reinforcement sleeve layer extending along the pipe structure in a length which includes the section of the pipe structure between the wire-pipe-exit-point and the straight-line-end-point, said reinforcement sleeve preferably extending along the pipe structure in a length which includes the anchoring point or points on the end-fitting.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF THE DRAWINGS

The invention will be explained more fully below in connection with a preferred embodiment and with reference to the drawings in which:

FIG. 7 shows partial view of an embodiment of a pipe structure according to the invention, FIG. 7.a being a side view, FIG. 7.b a cross sectional view and FIG. 7.c a perspective view.

The figures are schematic and simplified for clarity, and they just show details which are essential to the understanding of the invention, while other details are left out.

DETAILED DESCRIPTION OF EMBODIMENTS

Figure 1:
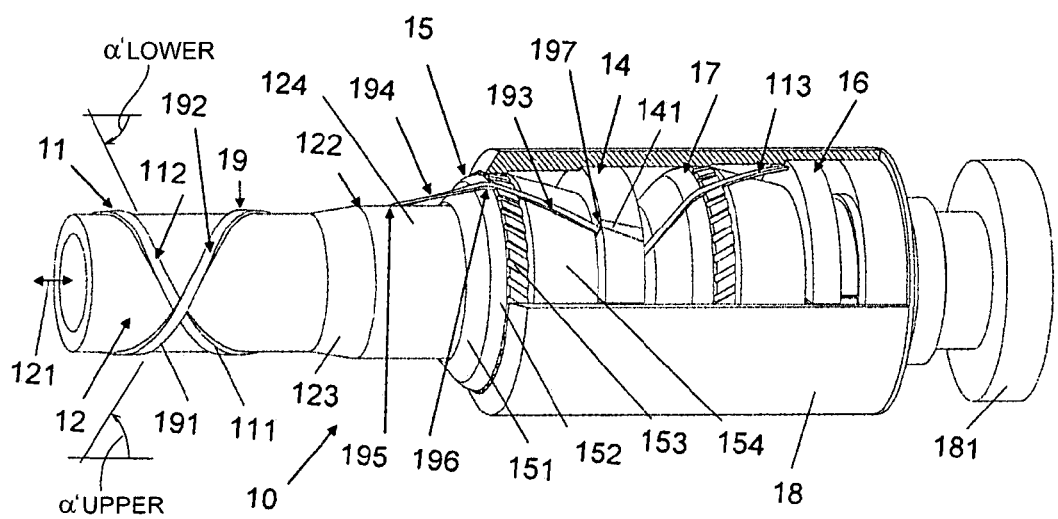
FIG. 1 shows a pipe structure according to the invention comprising a simplified flexible pipe connected to an end fitting.

FIG. 1 shows a pipe structure according to the invention wherein an open end of a flexible pipe is connected to an end fitting, the flexible pipe comprising armouring wires that are locked to the end fitting in anchoring elements thereby fixing the flexible pipe to the end fitting.

The pipe structure 10 (comprising a flexible pipe and an end fitting) comprises two armouring layers, a lower armouring layer 11 and an upper armouring layer 19, each comprising a helically wound armouring wire (111 and 191, respectively). For clarity, only one armouring wire of each layer is shown in the drawing. It should be noted that the armouring wires 111 and 191 may represent examples of a multitude of armouring wires constituting the lower and upper armouring layer, respectively. It should further be noted that the parts 193, 113 (see later) of the armouring wires of the upper and lower armouring layer, respectively, may not originate from (be part of) the same physical wire as is indicated by the reference numerals 191, 111, respectively. The armouring wires of the two armouring layers are wound with opposite winding angles (as seen relatively to the longitudinal direction 121 of the flexible pipe). The winding angles $\alpha_{upper}$, $\alpha_{lower}$ of the upper and lower armouring layers, respectively, are preferably in the range between 50 and 60°, e.g. $\alpha_{upper} = -\alpha_{lower} = 55°$.

The lower armouring layer 11 surrounds an underlying pipe layer 12 in the form of a cylindrical liner (optionally surrounding an inner carcass, not shown in FIG. 1 but shown as 2 in FIG. 6) around which the armouring wire 111 is helically wound. The upper armouring layer 19 surrounds the lower armouring layer 11 (which thus represents 'the underlying pipe layer' for the upper armouring layer) around which the armouring wire 191 is helically wound. An intermediate layer (not shown) between the two armouring layers 11, 19 may be inserted (in which case the intermediate layer represents the underlying pipe layer for the upper armouring layer). The armouring wires 111, 191 of the lower and upper armouring layers have a tape formed cross section when viewed perpendicular to a longitudinal direction of a wire (i.e. the wire is wider in a dimension that is tangential to the underlying pipe layer than in a dimension perpendicular to that). An advantage of the tape form, is that it conforms to the curvature of the underlying pipe layer and that it is relatively easy to avoid the introduction of twist to the wire during assembly.

The underlying pipe layer 12 for the lower armouring layer 11 comprises an armouring reinforcement section 122 that is designed to compensate the decreasing armouring effect of the armouring wires in the end fitting part of the pipe structure. The armouring reinforcement section 122 comprises a cylindrical part 124 extending through the end fitting to the terminating flange 181 (for connecting the pipe structure to installations or to another pipe at land or at sea) and a conical part 123 which adapts the dimension of the cylindrical part 124 to that of the underlying pipe layer 12 (or alternatively to that of the underlying pipe layer of the upper armouring layer), thereby providing a smooth transition section for the armouring wires 111, 191 of the lower and upper armouring layers 11, 19. In an embodiment of the invention, the cylindrical part 124 is terminated in the first support unit 15 (i.e. does not extend through the end fitting in its fall length to the terminating flange). In an embodiment of the invention, the lower armouring layer 11 runs beneath armouring reinforcement section 122 to be terminated in the support unit 17 and/or terminating part 16. In another embodiment of the invention, the cylindrical part 124 is terminated in the "second" support unit 17 (i.e. does not extend through the end fitting in its full length to the terminating flange). In an embodiment of the invention, the lower armouring layer 11 runs beneath the support unit 15 to be terminated in the support unit 17 and/or terminating part 16.

The armouring wire 191 of the upper armouring layer 19 has a conforming-wire-pipe-section 192 which conforms to the underlying pipe layer 11 (including a part of the armouring reinforcement section 122) until a wire-pipe-exit-point 195 where the armouring wire tangentially extends away from the underlying pipe layer 11 (in the form of the armouring reinforcement section 122). The part of the armouring wire 191 from the wire-pipe-exit-point to its termination in an anchoring element 141 in a terminating part 14 is termed 'the wire end fitting section' 193. The terminating part 14 may preferably be an integral part of the support unit 15 or alternatively be an independent part adjoined the support unit. Extending from the wire-pipe-exit-point 195 the armouring wire has an unsupported 'free path' or straight-line-section 194 that is terminated by the tangential point of contact 196 ('the straight-line-end-point') with the support unit 15. The support unit which is adapted to receive the armouring wire after its separation from the underlying pipe layer has a rotational symmetry around the longitudinal axis 121 of the flexible pipe and is arranged to surround the underlying pipe layer (i.e. including the armour reinforcement 122). The outer surface of the 'landing part' 152 of the support unit 15 on which the straight-line-end-point is located during normal operating conditions of the flexible pipe takes the form of a part of a torus (the outer surface 152 may alternatively be any convex surface of revolution relative to the longitudinal axis of the flexible pipe). The adapting part 151 of the support unit 15 serves as an intermediate body between the cylindrical part 124 of the armouring reinforcement section 122 and the landing part 152 of the support unit 15. The outer surface of the adapting part 151 has an inward curvature relative to the longitudinal direction of the flexible pipe. It might, however, take on other forms e.g. conical or even have an outward curvature, e.g. continue the torus form of the landing part 152.

The armouring wire 191 is supported by the support unit 15 from the straight-line-end-point 196 to an exit point 197 where the wire is received and fixed by an anchoring element 141. Embodiments of the anchoring element are discussed in relation to FIGS. 4 and 5.

Guiding channels 153 are arranged on or in connection with the transition part 154 of the support unit that supports the armouring wire between the landing part 152 and the terminating part 14 which hosts the anchoring elements 141. The anchoring of the wire may alternatively be located on the transition part 154. The transition part of the support unit has a conical outer surface that verges on the longitudinal axis 121 of the flexible pipe when viewed in a direction of the terminating flange 181. This yields a preferred, relatively compact solution. It may alternatively extend outwards, and possibly have an outward curvature. It is preferred that the wire end fitting section 193 of the path of the armouring wire is adapted to be free from 'points of discontinuity', i.e. that the outer surface transitions between the various parts of the support unit 15 are 'smooth'.

FIG. 1 further shows a support unit 17 and terminating part 16 for the lower armouring layer 11. The upper armouring layer 19 is arranged on the lower armouring layer 11 and the lower layer comprises a tape formed wire 111. The wire 111 of the lower layer is for descriptive purposes divided in a conforming-wire-pipe-section 112 and an end fitting section 113. The armouring layer 11 extends beneath the support unit 15 and terminating part 14 for the upper armouring layer 19. The armouring wire 111 of the lower armouring layer 11 is terminated on the support unit 17 and/or the terminating part 16.

Figure 2:
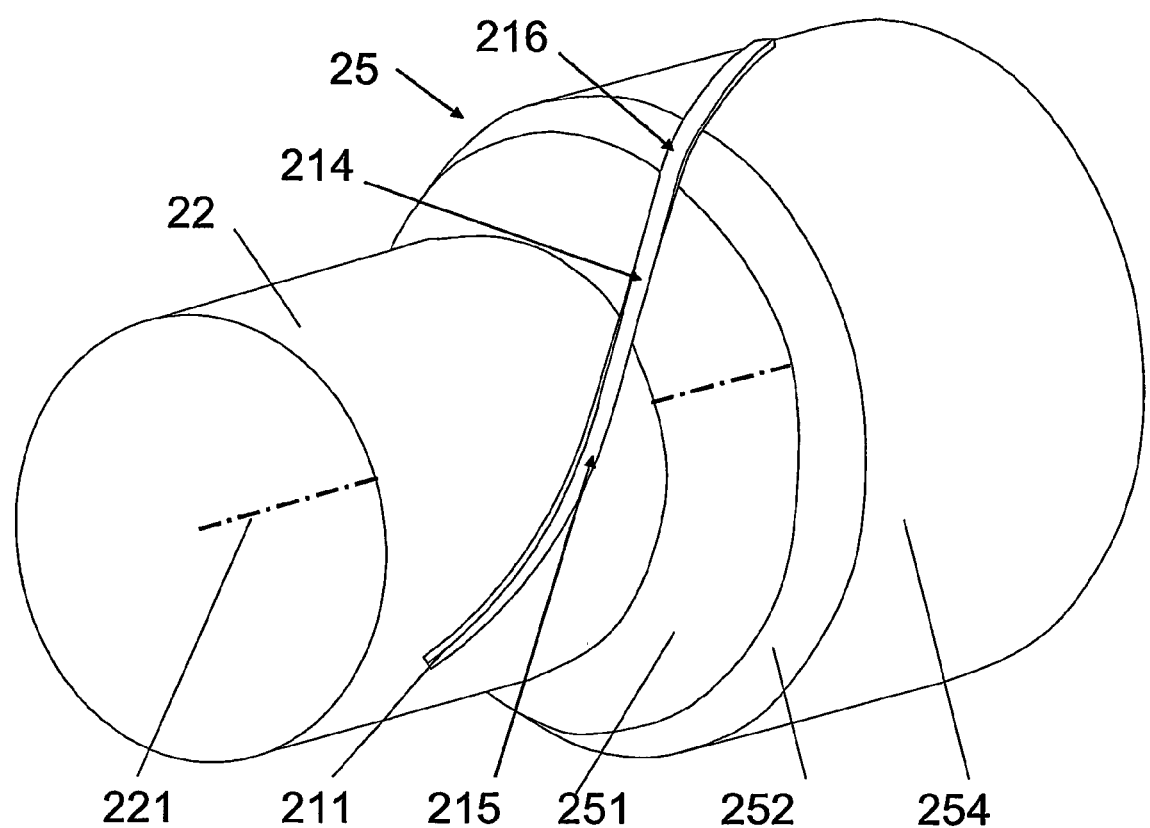
FIG. 2 shows a path of an armouring wire from the underlying pipe layer of the flexible pipe to the support unit of the end fitting, FIGS. 3.a and 3.b show different perspectives of a pipe structure according to the invention with two armouring layers with opposite winding angles, FIGS. 4.a, 4.b, 4.c show an embodiment of an anchoring element for locking an armouring wire to an end fitting by means of a spreader element, the locking cavity having a stepwise changing cross sectional area, FIG. 5.a, 5.b, 5.c show an embodiment of an anchoring element for locking an armouring wire to an end fitting by means of a spreader element, the locking cavity having a continuously changing cross sectional area.

In FIG. 2, the path of an armouring wire at the transition between the flexible pipe and the end fitting is shown. In a preferred embodiment as illustrated in FIG. 1, each armouring layer has its own support unit (15 and 17 in FIG. 1). FIG. 2 and the following description may apply to the lower armouring layer 11 as well as to the upper armouring layer 19 of FIG. 1. The armouring wire 211—preferably of a composite nature—initially conforming to the underlying surface 22 at a prescribed helical angle with the longitudinal axis 221 of the flexible pipe, is formed away from the underlying pipe surface 22, in such a way that the tangent direction at the point of separation 215 from the underlying surface is followed by the wire until this direction becomes tangent with the outer surface of a torus 252 at a straight-line-end-point 216, this torus being a part of the support unit 251. In a preferred embodiment, the wire 211 then follows a geodetic curve from the point of tangency 216 on the torus, until another surface 254 supports the wire. The geodetic curve is found by winding under tension. On this second surface the wire again follows a geodetic curve and may be securely and completely anchored by various means in an anchoring element (not shown, but corresponding to 141 in FIG. 1). Between the pipe tangent point 215 (the wire-pipe-exit-point) and the torus tangent point 216 (the straight-line-end-point), the wire follows a straight line path 214. The wire, having a rectangular cross section, is twisted to conform to both surfaces at the tangent points. In a preferred embodiment of the invention, the wire is surrounded by a soft filler material (e.g. an emulsion of a polymer) at least over the free path, unsupported section between the tangent points. The soft material is chosen to have a negligible effect on the deformation behaviour of the pipe and composite wire. This soft material may provide cooling or flushing of the environment surrounding the composite wire. The filler may be introduced in the volume of the end fitting limited by the support unit and the underlying pipe layer (e.g. the reinforcement section) and an outer layer surrounding the armouring layers or by the casing 18 of the end fitting (cf. FIG. 1) extended in the opposite direction of the end fitting.

FIGS. 3.*a* and 3.*b* show an embodiment of a part of a pipe structure according to the invention. The figures show the part of the pipe-to-end fitting transition, where the armouring wires of an armouring layer extend away from their underlying pipe layer for being received by a support unit of an end fitting. FIGS. 3.*a* and 3.*b* show the same section of the pipe structure exhibiting the same features but from different perspectives. A cut-out is made, so that the central opening of the pipe structure in the longitudinal direction 321 of the flexible pipe is exposed. An armouring reinforcement section 322 comprising a cylindrical section 324 and a conical section 323 surrounds an underlying pipe layer 32. Two armouring layers 31 and 39 each comprising helically wound, tape-formed armouring wires are shown. The lower armouring layer 31 is wound on the underlying pipe layer 32 and on the armouring reinforcement section 322 which it leaves for landing on a lower support unit 35, each armouring wire of the lower armouring layer 31 having an unsupported section between the armouring reinforcement section 322 and the lower support unit 35. The upper armouring layer 39 is wound on the lower armouring layer 31 which it leaves for landing on an upper support unit 37, each armouring wire having an unsupported section there between. The lower and upper support units 35, 37 supporting the lower and upper armouring layers 31, 39, respectively, are arranged concentrically around the underlying pipe layer 32 (with the armouring reinforcement section 322) and the upper support unit 37 is arranged around the lower support unit 35.

Figure 6:
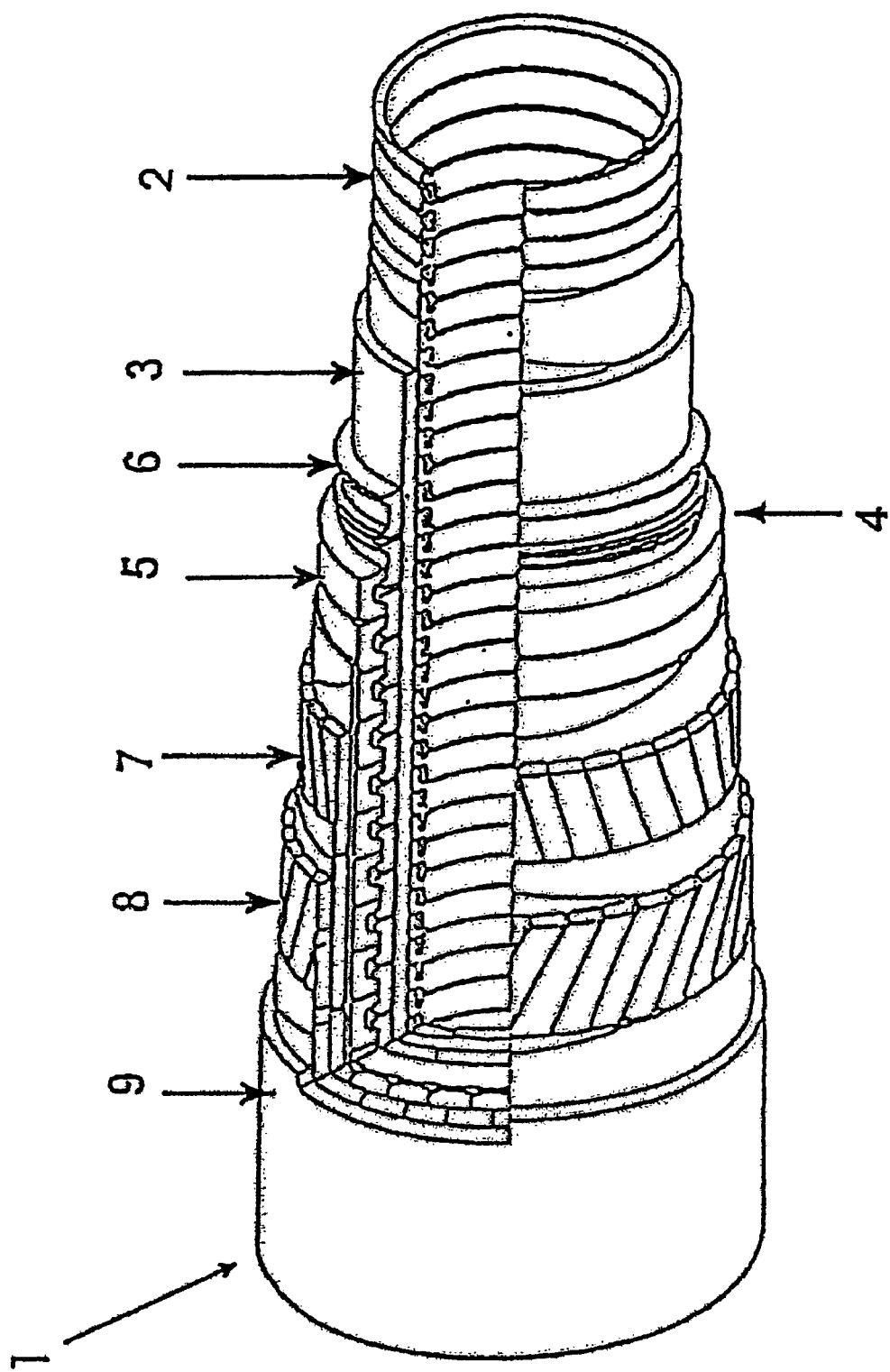
FIG. 6 shows an example of a flexible pipe suitable for being connected to an end fitting in a pipe structure according to the invention.

The layers 301 and 302 indicate other pipe layers, e.g. inner armouring layers, cf. e.g. FIG. 6 where various layers of an exemplary flexible pipe are shown. The support units 35, 37 and the anchoring elements (not shown) for fixing the armouring wires to the end fitting are surrounded by an outer casing 38.

FIG. 4.*a* shows an anchoring element 42 for locking an armouring wire 41 to an end fitting by means of a wedge formed spreader element 44 having a narrow end 441 and a broad end 442, the locking cavity 45 for holding the wire end and the spreader element having a stepwise changing cross sectional area, so that a first cross sectional area A1 is larger than a second cross sectional area A2, both taken perpendicular to the longitudinal direction of the wire in the locking cavity, the first cross section 421 (corresponding to A1) being taken closer to the broad end 442 of the spreader element 44 than the second cross section 422 (corresponding to A2) when the spreader element 44 is placed in the locking cavity 45, and at least one stepwise change 423 of the cross section of the locking cavity is present between the first and second cross sections 421 and 422. The anchoring element 42 for fixing an armouring wire 41 to an end fitting comprises a locking cavity 45 formed in a solid material (which may be part of a terminating element hosting a number of anchoring elements, cf. 14 or 16 in FIG. 1) and a wedge-formed element 44 adapted to be driven into the end of an armouring wire 41 thereby separating the wire in two parts 411, 412 over a certain length (when viewed in a cross section including a longitudinal axis of the wire) and fixing the wire to the solid material of the walls of the locking cavity 45. An adhesive 432 may optionally be introduced between the wedge and the split parts of the wire (represented by 411 and 412 in the cross sectional view of FIG.

4.*a*). An adhesive 431 may preferably be introduced between the wire 41 and the walls of the locking cavity 45. The wedge 44 may preferably be made of similar materials as the wire 41, e.g. composite, metallic (e.g. steel, aluminium, titanium), or another composite (than the wire). The wire may preferably be made of a composite material or a metallic material in any combination. The adhesive may e.g. comprise epoxy, polyurethane, a thermoplastic adhesive, a cementidious material, all possibly comprising particles/fibres/whiskers.

FIG. 4.*b* shows a cross sectional view of the armouring wire 41 in the locking cavity 45 in the cross section indicated by 421 in FIG. 4.*a* whereas FIG. 4.*c* shows a cross sectional view of the armouring wire 41 in the locking cavity 45 in the cross section indicated by 422 in FIG. 4.*a*. In FIG. 4.*b* the cross sectional area $A_1$ comprises the wedge 44 and the two separated parts 411, 412 of the wire embedded in an adhesive 431 fully or partially filling the empty volume between the wire and the surrounding solid material of the anchoring element 42. In FIG. 4.*c* the cross sectional area $A_2$ comprises essentially only the wire 41 surrounded by the solid material of the anchoring element 42.

Various methods of securing an armouring wire to an end termination are disclosed in our co-pending international patent application entitled "A method of securing reinforcement wires to an end termination of a pipeline or a cable, an end termination, and uses of the method and the end termination" published as WO-A-01/07818 and which is incorporated herein by reference.

FIG. 5.*a* shows an anchoring element 52 for locking an armouring wire 51 to an end fitting by means of a wedge formed spreader element 54 having a narrow end 541 and a broad end 542, the locking cavity 55 for holding the wire end and the spreader element having a continuously changing cross sectional area (at least over a part of its length along the wire), so that a first cross sectional area $A_1$ is larger than a second cross sectional area $A_2$, both taken perpendicular to the longitudinal direction of the wire in the locking cavity, the first cross section 521 (corresponding to $A_1$) being taken closer to the broad end 542 of the spreader element 54 than the second cross section 522 (corresponding to $A_2$) when the spreader element 54 is placed in the locking cavity 55. The anchoring element 52 for fixing an armouring wire 51 to an end fitting comprises a locking cavity 55 formed in a solid material (which may be part of a terminating element hosting a number of anchoring elements, cf. 14 or 16 in FIG. 1) and a wedge-formed element 54 adapted to be driven into the end of an armouring wire 51 thereby separating the wire in two parts 511, 512 over a certain length (when viewed in a cross section including a longitudinal axis of the wire) and fixing the wire to the solid material. A moulding 53 may preferably be introduced between the wire 51 and the walls of the locking cavity 55.

FIG. 5.*b* shows a cross sectional view of the armouring wire 51 in the locking cavity 55 in the cross section indicated by 521 in FIG. 5.*a* whereas FIG. 5.*c* shows a cross sectional view of the armouring wire 51 in the locking cavity 55 in the cross section indicated by 522 in FIG. 5.*a*. In FIG. 5.*b* the cross sectional area A1 comprises the laminated wire 51, which comprises alternating layers 513, 514 of a wire material (e.g. composite material, metallic tape, or other) and an adhesive material, respectively, the laminated wire being embedded in a 'grout' or moulding 53 (e.g. a particle filled casting material, cementidious material, a polymer, epoxy) which again is surrounded by the solid material of the anchoring element 52. In FIG. 5.*c* the cross sectional area $A_2$ comprises essentially only the armouring wire 51 (with layers 513, 514) surrounded by the solid material of the anchoring element 52.

A possible way of constructing laminated armouring wires is e.g. disclosed in our co-pending international patent application no. PCT/DK02/00355 entitled "A method of manufacturing a reinforcement element for a flexible pipe" which is incorporated herein by reference.

FIG. 6 shows an ordinary structure of a flexible reinforced pipe 1 with its different layers. The flexible pipe in FIG. 6 consists of an inner liner 3 surrounding a carcass which is formed by a helically wound metal tape 2 that forms an inner pipe. The metal tape 2 is formed with flaps in the manufacture which engage each other so as to lock the individual turns of the metal tape 2 to each other in such a manner that the carcass can be bent in its longitudinal direction. Since the inner carcass per se is not tight, the surrounding inner liner 3 serves the purpose of preventing flow of fluids to or from the interior of the pipe.

One or more layers of profiles 5, 6 are helically wound externally on the inner liner 3, said profiles forming turns of a great angle (e.g. 80-90°) relative to the longitudinal direction of the pipe. Because of the great angle, the profiles will primarily be capable of absorbing radial forces that occur because of internal or external pressures. The internal pressures occur in the operation of the pipe. The external pressures are caused partly by the hydrostatic pressure of the surroundings and partly by mechanical impacts during the laying of the pipe.

The turns thus form a compressive reinforcement 4 which prevents the inner liner 3 from bursting because of a high pressure on the inner side of the pipeline, or from collapsing because of a high pressure on the outer side of the pipeline.

It is additionally shown in FIG. 6 that the compressive reinforcement has externally applied thereto a tensile reinforcement, which consists of one or more layers 7, 8 comprising helically wound armouring wires.

An intermediate jacket may be interposed between the compressive reinforcement and the tensile reinforcement, serving the purpose of preventing fluids from migrating between the compressive reinforcement and the tensile reinforcement.

These layers may finally be surrounded by an outer sheath 9.

The tensile reinforcement 7, 8 is usually composed of two helically wound layers of steel profiles with opposite winding direction. The armouring wires may alternatively be made of other materials, e.g. composite materials.

In conventional pipe systems, the tensile reinforcement is secured to the end termination by welding. It may, however, as discussed above with relation to FIGS. 4 and 5 preferably be secured by means of a spreader element driven into the end of an armouring wire, the wire end with the spreader element being secured in a wedge-formed cavity a method (cf. also WO-A-01/07818).

FIG. 7 shows an embodiment of a pipe structure according to the invention. FIG. 7.*a* shows a side view of the pipe structure, FIG. 7.*b* a view along a longitudinal axis of the pipe structure, and FIG. 7.*c* a perspective view. An armour wire with a wedged end and two principal end fitting components, the support unit and an armouring reinforcement section unit, are shown.

For illustrative purposes only one wire of one layer is shown in FIG. 7. Other wires of the armouring layer 7 of which the wire 71 forms part may be locked in the 'empty' anchoring elements (here termination slots 73) of the support unit 72. It is understood that these components are a part of an assembly and as such do not show the complete end fitting. Wires of possible other layers may likewise be terminated in the locking grooves or alternatively in a separate set of grooves (as conceptionally illustrated in FIGS. 1 and 3).

The FIGS. 7.a to 7.c show a wire 71 representing the armour layer 7 which is to be terminated in part by the components shown and in part by additional components that make up the complete end fitting structure, comprising a conforming-wire-pipe-section 711 resting by surface contact on the armouring reinforcement section 74 that is designed to compensate the decreasing armouring effect of the armouring wires in the end fitting part of the pipe structure. The armouring reinforcement section is placed under the armour layer 7 and comprises a cylindrical section 741 shown here and other sections not shown that facilitate a transition to the underlying layer (cf. e.g. FIG. 1).

In an embodiment of the invention, the support unit 72 contains individual wire-support-and termination-slots 73 for receiving and terminating each wire 71. In an embodiment of the invention, each slot is made in the plane of tangency 75 (FIG. 7.b) of the wire to be terminated by that particular slot. This ensures that pipe deformation and resulting change of armouring wire angle with respect to the longitudinal axis 77 of the pipe is transformed into pure bending about the thinnest dimension of the armouring wire, thereby minimizing stresses. Each supporting surface 731 of the support unit 72 is a single curved surface (i.e. a surface that curves in only one dimension), oriented perpendicular to the tangent plane 75 wherein the corresponding armouring wire has its wire-pipe-exit-point, straight-line-section and straight-line-end-point. Therefore, the change in angle of the armour layer associated with applying tension and pressure to the pipe occurs in this tangent plane, moving the straight-line-end-point on the same curve on the supporting surface, namely the curve created by the intersection of the single curved supporting surface and the tangent plane.

In the embodiment of the invention shown in FIG. 7, the anchoring elements (here termination-slots 73) form part of the support unit 72. The anchoring elements are created by the individual-wire-support-and termination-slots 73 which create locking cavities 735 by the surfaces 733 and 734. The locking cavities 735 provided by the support unit are further enclosed by components not shown, such as an end flange to the support unit 72 and outer casing, represented schematically on FIG. 7.b by the circle 76.

The armouring wire 71 of the armour layer 7 has a conforming-wire-pipe-section 711 which conforms to the underlying pipe layer that includes the armouring reinforcement section 74 until a wire-pipe-exit-point 712 where the armouring wire tangentially extends away from the underlying pipe layer and thereby the armouring reinforcement section 74. The wire extends over a straight-line-section 713 to the tangential point of contact 714 (the straight-line-end-point), where a curved surface 731 of the individual-wire-support-slot 73 provides a smooth and controlled transition to the wire anchoring. The straight wire section 715 of the transition to the locking cavities 735 ensures that the anchoring is loaded only by a pure unidirectional tension, which maximize the effectiveness of the anchoring principle. The wire is lead into the locking cavity 735 by the straight-slot-section 732, wherein the wire is anchored. The anchoring is provided by driving a wedge formed spreader element 718 into the end of the wire 71, and securing the split armour wire parts 716 and 717 to the spreader element by gluing. Furthermore, anchoring is provided by the principle described in FIG. 5, since the angled surfaces 733 and the locking-cavity-side 734 provides an expanding cross sectional area of the locking cavity 735, and the wedged end 719 of the wire 71 also provides an increasing cross section, both in the direction towards the broad end of the wedged wire. An angled surface 733 and its adjacent straight-slot section surface 732 may preferably form an angle between 25° and 50°. A locking-cavity-side surface 734 and its adjacent straight-slot section surface 732 may preferably form an angle between 0° and 30°. The offset of the wedged wire end 719 relative to the locking cavity 735, in the direction of and away from the straight-slot-section 732, creates room for a moulding material, as described with respect to FIG. 5.

In an embodiment of the invention the angled surfaces 733 and locking-cavity-side 734 and even the surface of the straight-slot-section 732 may be a continuous surface, providing a smooth transition from the straight-slot-section 732, conforming to the wire thickness dimension and to the expanding cross sections in the locking cavity 735.

It is clear that the FIG. 7.a-7c shows only the principle for terminating a single wire layer, however it can applied to two or more layers in the manner given by FIG. 1 or FIG. 3.

An advantage of the embodiment of FIG. 7 is that because every wire is oriented on its own individually part-support-surface 731, assembly of the wires to the end fitting is eased because the anchoring elements are securely separated and shaped to ensure that wires do not slip on the surface and are not located in a wrong position thereby improving reliability. Further each anchoring element has its own separate cavity for fastening a wire with a corresponding wedge.

Some preferred embodiments have been shown in the foregoing, but it should be stressed that the invention is not limited to these, but may be embodied in other ways within the subject-matter defined in the following claims.

The invention claimed is:

1. A pipe structure comprising a flexible pipe connected to an end fitting, the flexible pipe comprising an armour layer and an underlying pipe layer to said armour layer, said underlying pipe layer having an outer surface around which armouring wires of an armouring layer are wound, the flexible pipe having a longitudinal axis, wherein said end fitting comprises:
one or more anchoring elements adapted for anchoring at least one of said armouring wires, and
a support unit arranged coaxially around said underlying pipe layer;
at least one of said armouring wires comprising
a conforming-wire-pipe-section forming a helical path and conforming to the outer surface of said underlying pipe layer of said flexible pipe at least over a part of its length, and
a wire-end-fitting-section;
said two wire sections extending in opposite directions from a wire-pipe-exit-point where said armouring wire separates tangentially away from said underlying pipe layer; and
said wire follows an essentially straight line of a length $L_{free}$ between said wire-pipe-exit-point and a straight-line-end-point on said support unit, said essentially straight line part of the wire being defined as the straight-line-section, and said straight-line part is essentially unsupported between said wire-pipe-exit-point and said straight-line-end-point on said support unit.

2. A pipe structure according to claim 1 wherein said wire-end-fitting-section is arranged to follow a predefined termination path between said wire-pipe-exit-point and one of said anchoring elements when said pipe structure is in an unloaded condition.

3. A pipe structure according to claim 1, wherein said straight-line-section extends away from said longitudinal axis when viewed from said wire-pipe-exit-point.

4. A pipe structure according to claim 1, wherein said straight-line-section of said armouring wire has a tangential point of contact with said support unit in said straight-line-end-point.

5. A pipe structure according to claim 1, wherein said underlying pipe layer of said flexible pipe comprises an armouring reinforcement on a section of the pipe structure including said wire-pipe-exit-point and extending in a direction of the end fitting as defined by a direction from the flexible pipe towards the end fitting.

6. A pipe structure according to claim 2, wherein said predefined termination path further comprises a supported-wire-section running on the outer surface of said support unit from said straight-line-end-point to a support-unit-exit-point where the armouring wire leaves the surface of said support unit for being locked in one of said anchoring elements, said supported-wire-section essentially constituting a geodetic curve between said straight-line-end-point and said support-unit-exit-point on said outer surface of said support unit.

7. A pipe structure comprising a flexible pipe connected to an end fitting, the flexible pipe comprising an armour layer and an underlying pipe layer to said armour layer, said underlying pipe layer having an outer surface around which armouring wires of an armouring layer are wound, the flexible pipe having a longitudinal axis, wherein said end fitting comprises:
   one or more anchoring elements adapted for anchoring at least one of said armouring wires; and
   a support unit arranged coaxially around said underlying pipe layer;
   at least one of said armouring wires comprising
      a conforming-wire-pipe-section forming a helical path and conforming to the outer surface of said underlying pipe layer of said flexible pipe at least over a part of its length, and
      a wire-end-fitting-section,
      said two wire sections extending in opposite directions from a wire-pipe-exit-point where said armouring wire separates tangentially away from said underlying pipe layer; and
   said wire follows an essentially straight line of a length $L_{free}$ between said wire-pipe-exit-point and a straight-line-end-point on said support unit, said essentially straight line part of the wire being defined as the straight-line-section; and
   wherein the support unit comprises elements arranged to receive individual armouring wires.

8. A pipe structure according to claim 7 wherein the support unit has a supporting surface, and the supporting surface of said support unit where said straight-line-end-point is located is individually formed for different wires having their straight-line-end-point located on said support unit.

9. A pipe structure according to claim 8 wherein the supporting surface of a wire is a single curved surface oriented normal to the pipe tangent plane of the wire, containing the said straight-line-section of said wire.

10. A pipe structure according to claim 1, wherein said support unit has an outer surface that describes a surface of revolution with an axis of revolution that coincides with the longitudinal axis of the flexible pipe.

11. A pipe structure comprising a flexible pipe connected to an end fitting, the flexible pipe comprising an armour layer and an underlying pipe layer to said armour layer, said underlying pipe layer having an outer surface around which armouring wires of an armouring layer are wound, the flexible pipe having a longitudinal axis, wherein said end fitting comprises:
   one or more anchoring elements adapted for anchoring at least one of said armouring wires; and
   a support unit arranged coaxially around said underlying pipe layer;
   at least one of said armouring wires comprising
      a conforming-wire-pipe-section forming a helical path and conforming to the outer surface of said underlying pipe layer of said flexible pipe at least over a part of its length, and
      a wire-end-fitting-section,
      said two wire sections extending in opposite directions from a wire-pipe-exit-point where said armouring wire separates tangentially away from said underlying pipe layer; and
   said wire follows an essentially straight line of a length $L_{free}$ between said wire-pipe-exit-point and a straight-line-end-point on said support unit, said essentially straight line part of the wire being defined as the straight-line-section; and
   wherein said support unit has an outer surface which includes a part of a torus on which the straight-line-end-point is located.

12. A pipe structure according to claim 1, wherein said support unit has a convex part with an outer surface with an outward curvature and said straight-line-end-point is located on said convex part of the support unit.

13. A pipe structure comprising a flexible pipe connected to an end fitting, the flexible pipe comprising an armour layer and an underlying pipe layer to said armour layer, said underlying pipe layer having an outer surface around which armouring wires of an armouring layer are wound, the flexible pipe having a longitudinal axis, wherein said end fitting comprises:
   one or more anchoring elements adapted for anchoring at least one of said armouring wires; and
   a support unit arranged coaxially around said underlying pipe layer;
   at least one of said armouring wires comprising
      a conforming-wire-pipe-section forming a helical path and conforming to the outer surface of said underlying pipe layer of said flexible pipe at least over a part of its length, and
      a wire-end-fitting-section,
      said two wire sections extending in opposite directions from a wire-pipe-exit-point where said armouring wire separates tangentially away from said underlying pipe layer; and
   said wire follows an essentially straight line of a length $L_{free}$ between said wire-pipe-exit-point and a straight-line-end-point on said support unit, said essentially straight line part of the wire being defined as the straight-line-section; and
   wherein said support unit comprises at least a first and a second body, said first body of the support unit has an outer surface which includes a part of a torus, and said second body has an outer surface that describes a surface of revolution, both surfaces having the same axis of revolution, said axis coinciding with the longitudinal axis of the flexible pipe, and both surfaces having coinciding tangents in a joining point in a cross sectional plane including the axis of revolution.

14. A pipe structure according to claim 13 wherein said second body comprises guiding elements for guiding armouring wires received from said first body.

15. A pipe structure according to claim 1, wherein said anchoring elements for locking said armouring wires to said end-fitting are distributed on one or more terminating parts.

16. A pipe structure according to claim 15 wherein the flexible pipe comprises more than one armouring layer and separate support units and terminating parts are allocated to each layer.

17. A pipe structure according to claim 1, wherein said straight-line-section of an armouring wire is surrounded by a material which does not substantially alter the deformation behaviour of the flexible pipe and the wire.

18. A pipe structure according to claim 1, wherein the flexible pipe is an un-bonded flexible pipe comprising a tube formed liquid tight inner liner and one or more armour layers.

19. A pipe structure according to claim 1, wherein said flexible pipe comprises two layers of helically wound armouring wires, the winding angles with respect to the longitudinal direction of the flexible pipe being between 50 and 60 degrees.

20. A pipe structure according to claim 1, wherein said armouring wire or wires are made of a composite material.

21. A pipe structure according to claim 1, wherein said armouring wire or wires are in the form of a layered wire comprising two or more layers of materials which may be identical or different from each other.

22. A pipe structure according to claim 21 wherein said armour layers of the wire or wires are made from one or more of the materials selected from the group consisting of metals, thermoplastic polymers, and thermosetting polymers.

23. A pipe structure according to claim 1, wherein said armouring wire or wires is/are in the form of a layered wire comprising two or more layers of materials which layers being held together by a wrapping material and/or by adhesive forces.

24. A pipe structure according to claim 1, wherein the or each armour layer comprises one or two or a multitude of armouring wires.

25. A pipe structure according to claim 1, wherein said armouring wire(s) is/are flat, said wire or wires having a square formed cross section.

26. A pipe structure according to claim 1, wherein each of the layers of the flexible pipe are fixed to said end-fitting.

27. A pipe structure according to claim 1, wherein said end-fitting comprises an axially extending through opening, said armouring wire or wires being supported by the outer surface of said support unit, wherein the outer surface means the surface turning away from the axially extending through opening.

28. A pipe structure according to claim 1, wherein the armouring wire or wires is/are anchored by being embedded in a casting material.

29. A pipe structure according to claim 1, wherein the end-fitting comprises one or more locking cavities, said armouring wire or wires is/are anchored in said locking cavity or cavities.

30. A pipe structure according to claim 29 wherein the armouring wire or wires are anchored by a spreader element driven into the wire or wires in said locking cavity or cavities.

31. A pipe structure comprising a flexible pipe connected to an end fitting, the flexible pipe comprising an armour layer and an underlying pipe layer to the armour layer, the underlying pipe layer having an outer surface around which armouring wires of an armouring layer are wound, the flexible pipe having a longitudinal axis, wherein the end fitting comprises:
one or more anchoring elements adapted for anchoring at least one of the armouring wires, and
a support unit arranged coaxially around the underlying pipe layer;
at least one of the armouring wires comprising:
a conforming-wire-pipe-section forming a helical path and conforming to the outer surface of the underlying pipe layer of the flexible pipe at least over a part of its length, and
a wire-end-fitting-section;
the two wire sections extending in opposite directions from a wire-pipe-exit-point where the armouring wire separates tangentially away from the underlying pipe layer; and
the wire follows an essentially straight line of a length $L_{free}$ between the wire-pipe-exit-point and a straight-line-end-point on the support unit, the essentially straight line part of the wire being defined as the straight-line-section;
wherein the end-fitting comprises one or more locking cavities, the armouring wire or wires being anchored in the locking cavity or cavities, wherein at least one locking cavity has a length dimension defined as the length dimension of a wire mounted in the locking cavity, and the cross sectional area perpendicular to the length of the locking cavity differs along its length in one or more steps or continuously, wherein a first cross sectional area perpendicular to the length of the locking cavity is smaller than a second cross sectional area perpendicular to the length of the locking cavity, and wherein the first cross section is closer to the support unit than the second cross section.

32. A pipe structure according to claim 31 wherein the armouring wire or wires is/are anchored by use of a spreader element driven into the wire or wires in the part of said locking cavity or cavities where a first cross sectional area perpendicular to the length of the respective locking cavity is larger than a second cross sectional area perpendicular to the length of the respective locking cavity, the second cross section being taken closer to the support unit than the first.

33. A pipe structure according to claim 1, wherein the armouring wire or wires is/are anchored to the end-fitting by use of a spreader element driven into the wire to thereby spread the wire into two or more laminates whereby the laminated wire or wires is fixed against the wall or walls of a locking cavity formed in the end-fitting.

34. A pipe structure according to claim 1, wherein the flexible pipe comprises two armour layers and the end fitting comprises two annular support units, the wire or wires of a first armour layer being supported by a first annular support unit, and the wire or wires of a second armour layer being supported by a second annular support unit.

35. A pipe structure according to claim 1, wherein the pipe structure comprises a reinforcement sleeve layer placed below the one or more armouring layer or layers, and said reinforcement sleeve layer extends along the pipe structure in a length which includes the section of the pipe structure between the wire-pipe-exit-point and the straight-line-end-point.

* * * * *